US006875949B2

(12) United States Patent
Hall

(10) Patent No.: US 6,875,949 B2
(45) Date of Patent: Apr. 5, 2005

(54) METHOD OF WELDING TITANIUM AND TITANIUM BASED ALLOYS TO FERROUS METALS

(75) Inventor: Peter C. Hall, Upper Arlington, OH (US)

(73) Assignee: Edison Welding Institute, Columbus, OH (US)

( * ) Notice: Subject to any disclaimer, the term of this patent is extended or adjusted under 35 U.S.C. 154(b) by 0 days.

(21) Appl. No.: 10/391,921

(22) Filed: Mar. 19, 2003

(65) Prior Publication Data

US 2004/0182835 A1 Sep. 23, 2004

(51) Int. Cl.[7] ............................................... B23K 26/00

(52) U.S. Cl. ............................ 219/121.64; 219/121.63; 219/121.85

(58) Field of Search ........................ 219/121.64, 121.63, 219/121.85, 121.66, 121.65; 148/540, 579, 669, 675

(56) References Cited

U.S. PATENT DOCUMENTS

| | | | | |
|---|---|---|---|---|
| 2,985,747 A | * | 5/1961 | Kutchera | ................ 219/137 R |
| 4,674,675 A | | 6/1987 | Mietrach | |
| 4,708,282 A | | 11/1987 | Johnsen et al. | |
| 5,488,959 A | | 2/1996 | Ales | |
| 6,000,601 A | | 12/1999 | Walak | |
| 6,110,199 A | | 8/2000 | Walak | |
| 6,379,392 B1 | | 4/2002 | Walak | |
| 6,410,165 B1 | | 6/2002 | Warren et al. | |

FOREIGN PATENT DOCUMENTS

WO    WO0145578 A2    12/2000

OTHER PUBLICATIONS

Wang, Ge; Welding of Nitinol to Stainless Steel, SMT Proc of the 2nd Intern. Conf. on Shape Memory and Superelastic Technologies; 1997 pp. 131–136; California, no month.*
Duerig, The Use of Superelasticity in Modern Medicine, MRS Bulletin, Feb. 2002, pp. 101–104, vol. 27, No. 2, ISSN: 0883–7694.
Hall, Resistance Welding Ti–Rich Nitinol Wire, SMST Proceedings of the Third International Conference on Shape Memory and Superelastic Technologies, 2000, pp. 67–75, California.
Hodgson, et al., Shape Memory Alloys, Shape Memory Alloys, Inc., Copyright 1999, Santa Clara, California.
Wang, Welding of Nitinol to Stainless Steel, SMST Proceedings of the Second International Conference on Shape Memory and Superelastic Technologies, 1997, pp. 131–136, California.

* cited by examiner

Primary Examiner—M. Alexandra Elve
(74) Attorney, Agent, or Firm—Gallagher & Dawsey Co. LPA; Michael J. Gallagher; David J. Dawsey

(57) ABSTRACT

A method of welding titanium, and titanium based alloys, to ferrous metals is described. Welding of titanium, and titanium based alloys, is plagued with poor quality and highly brittle welds, substantially due to formation of Ti—Fe intermetallics in the weld pool. The instant invention provides supplementary filler material to alter the proportions of various elements in the weld pool. Certain fillers, such as nickel or iron, added to the weld pool enable high quality welds to be fabricated utilizing a wide variety of fusion welding techniques, including laser welding, between titanium, or titanium based alloys, and ferrous metals, including but not limited to the welding of nickel-titanium and stainless steel. Filler material may be supplied in various forms, including foil, wire, powders, preformed gaskets, and numerous others. Optionally, the titanium or titanium based alloy may be stress relieved to achieve full recovery of the shape memory strain prior to welding.

42 Claims, 8 Drawing Sheets

METHOD OF WELDING TITANIUM AND TITANIUM BASED ALLOYS TO FERROUS METALS

TECHNICAL FIELD

The present invention relates to the field of material joining; particularly, to a method of welding titanium, and titanium based alloys, to ferrous metals.

BACKGROUND OF THE INVENTION

Titanium and titanium alloys have become important structural metals due to an unusual combination of properties. These alloys have strength comparable to many stainless steels at much lighter weight. Additionally, they display excellent corrosion resistance, superior to that of aluminum and sometimes greater than that of stainless steel. Further, titanium is one of the most abundant metals in the earth's crust, and as production methods become more economical, will be employed in ever growing applications. Various alloys of nickel and titanium are part of the alloy class known as Shape Memory Alloys (SMAs). This term is applied to that group of metallic materials that demonstrate the ability to return to a defined shape or size with thermal processing. In a most general sense, these materials can be plastically deformed at some relatively low temperature and return to their pre-deformation shape upon some exposure to higher temperatures.

SMAs have been observed for more than 70 years in a wide range of alloys, such as AuCd, CuZn, FePt, and FeMnSi. Although a wide variety of alloys have been observed to demonstrate the shape memory effect, only those that either generate significant force or are able to recover substantial amounts of strain are of commercial interest. Currently, this has generally been the nickel-titanium (NiTi) alloys, including Nitinol (an acronym for NIckel TItanium Naval Ordinance Laboratory) alloys, and such copper based alloys as CuZnAl and CuAlNi. Nickel-titanium, for example, is commercially available in such diverse forms as wire, ribbon, tubing including microtubing, sheet, and can be formed into rods, bars, solid wire, stranded wire, braided wire, sputtering targets, and thin films for use in a wide variety of industries SMAs undergo a phase transformation in their crystalline structure when cooled through a transition temperature from the relatively stronger, high temperature or "Austenite (or austenitic)" form to the relatively weaker, low temperature or "Martensite (or martensitic)" form. Such crystalline transformations are responsible for the hallmark characteristics of these materials; their thermal, or shape, memory; and their mechanical memory. When a SMA is in its low temperature, or martensitic, form, it can be easily deformed into a new shape. If the deformed material is heated through a transformation temperature, the material reverts to the higher temperature, or austenitic, form. The material regains its original shape, sometimes reverting in shape with great force. Very slight differences in the alloy composition of the SMA can considerably affect the transition temperature for an alloy, as can heat treatment of the alloy. The shape memory effect takes place over a range of just a few degrees and the transformation effect can be controlled to take place within a degree or two of desired temperature.

"Mechanical memory" is demonstrated if the SMA is deformed at a temperature which is slightly above the transformation temperature. This effect is caused by stress induced martensitic formation. The martensitic material will revert immediately to the undeformed austenitic form as soon as the stress is removed. This makes the material highly elastic and rubber-like, and able to recover up to approximately 8% recoverable strain.

The "thermal memory" of these alloys, that is, their tendency to return to a predetermined shape after thermal processing, is not qualitatively different from their "mechanical memory," that is, their tendency to elastically deform, and then to return to their original configuration, when held at a constant temperature. This mechanical memory is also called "superelasticity" or "pseudoelasticity." This property of superelasticity observed in SMAs has led to widespread commercial use in such diverse fields as cellular telephone antennas, eyeglass frames, women's brassieres, fishing lures, and medical devices. The area of medical devices has been of particular interest, as nickel-titanium alloys have shown a high degree of biocompatibility, corrosion resistance under physiologic conditions, and excellent cytocompatibility. Additionally, nickel-titanium has a lower magnetic susceptibility than stainless steel, making it compatible with MRI (Magnetic Resonance Imaging) systems. Superelasticity allows the passage of a complex instrument through a narrow cannula, and then to have the instrument elastically regain its desired conformation upon exiting the cannula. Applications include, by way of example and not limitation, right-angle needles, suture passers, retractors, graspers, baskets, and various retrieval devices. Since the nickel in these alloys is chemically bound to the titanium in a strong intermetallic bond, risks of human tissue reaction have been shown to be low.

A major limitation in the use of nickel-titanium alloys has been the difficulty of joining this material, both to itself, and to other materials. Because of its high cost, it is often desirable to limit the use of nickel-titanium to the actual moving parts of a device, while fabricating supporting members of such materials as stainless steel. However, welding of nickel-titanium to stainless steel has proved particularly troublesome, as disclosed by Ge Wang, in a review "Welding of Nitinol to Stainless Steel."

Fusion welding has been fraught with difficulties, particularly, problems surrounding issues of solidification, or "hot," cracking, and cracking due to intermetallic formation, or so-called "cold" cracking. Hot cracking is due to inherent characteristics of alloys. Unlike pure metals, alloys solidify through a range of temperatures, rather than at a single melting point. This temperature range, called the freezing zone or mushy zone, is a temperature zone in which the high melting point constituents of the alloy solidify first and form a continuous interlocking solid network. During the cooling of welds, the alloy, both liquid and solid, continuously shrinks in volume, so that a tensile force is constantly applied across a solid network that is interlaced by a thin liquid film. This tensile force causes cracks to form at the liquid metal filled grain boundaries, and these cracks then propagate through the weld zone. The larger the mushy zone, the more severe the solidification cracking problem. Low melting point impurities such as phosphorous (P) or sulfur (S) can contribute to hot cracking. For example, S in as low a concentration of 9 ppm in a nickel alloy can be sufficient to cause hot cracking.

"Cold" cracking is a particular problem when attempting to weld nickel-titanium to other materials, and is responsible for common observations in the art that welding is generally not an acceptable method of joining nickel-titanium to other materials, e.g., stainless steel, because brittle intermetallics are formed in the weld zone. Ti and Fe form the brittle intermetallic compounds TiFe and TiFe$_2$, both of which can cause cold cracking at welded joints. The compressive strength of the intermetallics compounds TiFe and TiFe$_2$ is virtually zero due to their extreme brittleness. Techniques such as direct fusion welding cause intermetallic formation at the bond line, and consequential failure of the weld. Even solid state bonding techniques which do not require melting at the weld interface, while they initially form a stronger weld, are susceptible to solid state diffusion of intermetallics into the weld line, and consequential weakening.

In addition, the reactivity of titanium makes it important that any welding be done in a clean, inert atmosphere or in a vacuum, to reduce the tendency to form damaging oxides or nitrides. Nickel-titanium materials naturally form surface oxides in air during processing into finished form. The principal surface oxide formed is TiO$_2$.

Compared with attempts to weld nickel-titanium to ferrous metals, more success has been experienced with joining nickel-titanium to itself with such techniques as laser welding, plasma welding, resistance welding, and e-beam welding. Subtle variations in the composition of the nickel-titanium alloys greatly affect the inherent stability of homologous nickel-titanium welds. For example, nickel rich nickel-titanium alloys, such as those that are comprised of approximately 50.5% nickel, are readily weldable to itself by the above techniques. On the other hand, titanium rich nickel-titanium alloys, such as those composed of approximately 51.5% titanium, are susceptible to solidification cracking. The instant inventor showed improvement in homologous nickel-titanium welds with the addition of nickel to the weld pool in his review, "Resistance Welding Ti-Rich Nitinol Wire." Grain boundaries have been shown to be still wet with liquid during the last stages of solidification and are easily separated by thermal shrinking stresses. As a result, cracks form at the weld metal centerline.

However, the difficulty of joining nickel-titanium to other materials, such as stainless steel, has remained exceedingly limiting to the art. Many techniques have been employed with limited success. Non-fusion joining methods are most commonly used to join nickel-titanium; including soldering, epoxies and other adhesives; and various types of mechanical joining such as crimping. These techniques are not without their problems. Soldering, for example, must often be accomplished with special flux to remove and inhibit the formation of surface oxides during soldering. Epoxies and adhesives are not suitable for all manufacturing techniques and types of uses to which these nickel-titanium products are directed. Mechanical fastening may cause overdeformation and cracking of the nickel-titanium. Interference fit or the interlocking of components has been successful, but requires manufacturing to close dimensional tolerances.

Various methods have been used to attempt to improve results in welding of titanium alloys to ferrous metals. One such example is seen in U.S. Pat. No. 4,674,675 to Mietrach. The '675 method relies upon providing at least two intermediate metallic layers for placement between the titanium containing portion and the ferrous portion. The layer adjoining the titanium containing portion is vanadium and the layer adjacent to the ferrous metal is one of the group consisting of chromium, nickel, and iron. The resulting multilayer composition is then diffusion welded together. This approach suffers from the inherent complexity of a multilayer approach, which is disclosed in some embodiments to employ even more layers, consisting of tungsten and platinum, added to the vanadium and chromium/nickel/ or iron layer. Additionally, the nature of diffusion welding makes the process quite slow and cumbersome, requiring approximately 90 minutes at a pressure of 10 Newtons per square millimeter to achieve a satisfactory diffusion weld.

Additionally, U.S. Pat. No. 3,038,988 to Kessler discloses the use of a vanadium interlayer between titanium and a ferrous metal, wherein the electrode pressure, the strength of the welding current, and the welding time are regulated such that an unmelted, or solid, core of the vanadium interlayer is preserved. This prevents intermixing of the ferrous and titanium elements and the consequent prevention of intermetallic formation; however, welding conditions must be strictly controlled in order to prevent the liquefaction of the vanadium interlayer, making this technique less suitable for production use. Following this practice of using a vanadium interlayer, U.S. Pat. No. 4,708,282 to Johnsen et al. teaches the use of a sintered material made of vanadium, titanium, and iron, allowing for complete melting of the weld metal without intermetallic formation. Such a method suffers from the additional steps involved in the complex manufacture of the tripartite weld metal.

Further, U.S. Pat. No. 6,410,165 teaches a method of nickel enriching the weld zone specifically directed to the welding of a high carbon, powder metallurgical, cobalt free tool steel that contains greater than 1 wt. % of carbon and total refractory metal additions greater than 15 wt. %.

Accordingly, the art has needed a means for improving the art of fusion welding titanium, and titanium based alloys, to ferrous metals. While some of the prior art devices attempted to improve the state of the art, none has achieved the unique and novel configurations and capabilities of the present invention. With these capabilities taken into consideration, the instant invention addresses many of the shortcomings of the prior art and offers significant benefits heretofore unavailable. Further, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations. An object of the invention is to provide an improved method of welding titanium, and titanium based alloys, to ferrous metals. A further object, in particular, is to provide an improved method of welding nickel-titanium and stainless steel. The instant invention demonstrates such capabilities and overcomes many of the shortcomings of prior methods in new and novel ways.

In one of the many preferable configurations, the method comprises a method of welding titanium, or a titanium based alloy, to a ferrous metal to produce a strong and ductile weld. The method comprises in general, the steps of placing at least one titanium, or a titanium based alloy, workpiece in close proximity to a ferrous metal workpiece, thereby forming a joint. A quantity of a filler material is added substantially at the joint. In preferred embodiments, the filler material may be nickel or iron. Shielding may be provided around the joint, such as by way of example and not limitation, placing the workpieces in a vacuum or flooding the joint with inert gas.

The joint is then fusion welded, by any of various means of fusion welding, including, in a preferred embodiment, pulsed laser welding. The fusion welding produces a weld pool fully incorporating the filler material to achieve a predetermined composition of the weld pool, and, in a preferred embodiment, the relative proportions of metal in the weld pool are substantially equal amounts of iron, titanium, and filler material. The filler material may be any nickel or iron bearing metal or may be substantially pure nickel or may be substantially pure iron. While the method is generally applicable to all titanium and ferrous metal combinations, the titanium, or titanium based alloy, workpiece may be nickel-titanium and the ferrous metal workpiece may be stainless steel. Testing showed that the tensile strength of the resulting weld is substantially equal to that seen when welding nickel-titanium to itself. The workpieces may be in any shape, including sheet, bar, tube, or, in the preferred embodiment, wire. Optional steps include cleaning the workpieces prior to welding and stress relieving, that is to say, achieving substantially full recovery of the shape memory strain, of the titanium, or titanium based alloy, workpiece. Such stress relief may be achieved by annealing, shot peening, or other stress relieving process as would be familiar to one skilled in the art.

These variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

Figure 1:
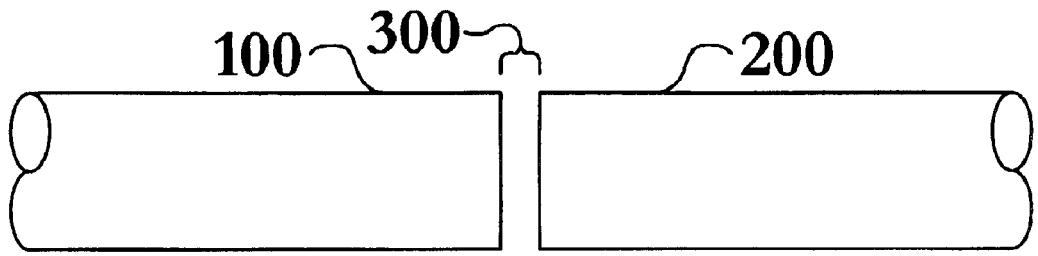
FIG. 1 shows an elevation view of titanium, or titanium based alloy, workpiece and a ferrous metal workpiece in the embodiment of two adjacent wires with a joint between their ends.

Also, in the various figures and drawings, the following reference symbols and letters are used to identify the various elements described herein below in connection with the several figures and illustrations: R.

DETAILED DESCRIPTION OF THE INVENTION

The method of fusion welding titanium, or titanium based alloys, to ferrous metals of the instant invention enables a significant advance in the state of the art. The preferred embodiments of the apparatus accomplish this by new and novel arrangements of elements and methods that are configured in unique and novel ways and which demonstrate previously unavailable but preferred and desirable capabilities. In particular, the method produces a weld zone that is substantially free of certain brittle intermetallic compounds, such as, by way of example and not limitation, FeTi and $TiFe_2$, which cause brittleness of the weld bond. The method also produces a highly reproducible weld metal, such that with a reasonably simple mathematical calculation, a skilled operator can readily determine and fix the alloy composition of the weld pool. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Experiment 1

To establish baseline variability in alloy ductility, various metal alloys were subjected to arc melting and subsequent ductility testing. As a uniform procedure, all components were placed in a small $H_2O$ cooled crucible. The crucible was argon shield gas purged for 2 minutes. An arc was struck and all material was melted into a single ball. The resulting ball was then cooled in argon gas before being exposed to hammer blows to estimate the relative ductility of the material. The purpose of this experiment was to confirm observations within the art, without introducing variables associated with welding processes, as to the approximate relative ductility of various alloys of iron, nickel, titanium, and aluminum. Results are shown in Table I.

TABLE I

| Sample # | Composition (Weight to Weight %) | Ductility Observation |
|---|---|---|
| 1 | Ni - 56%<br>Ti - 44% | 5 hits, ductile, no cracks |
| 2 | Ti - 86%<br>Fe - 14% | 3 hits, some cracking |
| 3 | .070" Nickel-titanium Wire | Ductile, no cracks<br>(Oxidized Surface) |
| 6 | Fe - 75%<br>Al - 25% | 6 blows to open crack |

TABLE I-continued

| Sample # | Composition (Weight to Weight %) | Ductility Observation |
|---|---|---|
| 7 | Fe - 75%<br>Al - 25% | (No oxidation)<br>4 blows to break |
| 8 | Ni - 68%<br>Al - 32% | Extremely brittle |
| 11 | Ti - 54%<br>Fe - 46% | Extremely brittle |
| 13 | Ti - 14%<br>Fe - 86% | 2 blows to cracking |

As expected, samples of nickel-titanium (Samples #1 and 3) showed good ductility, with little tendency toward cracking. Alloys of iron and aluminum showed moderate ductility, while those alloys expected to produce large quantities of intermetallics, such as titanium-iron (Sample 11 and 13), were brittle and showed a pronounced tendency to break under hammer blows. The brittleness of the iron and titanium combinations tended to confirm the widespread previous observation in the art of material joining that the combination of nickel-titanium and stainless steel in subsequent welds was likely to be particularly troublesome.

Experiment 2

To approximate the joining of nickel-titanium and stainless steel, the arc melting protocol above was performed using equal (50—50) weight to weight % of nickel-titanium and stainless steel wire. Various other metals were added to examine potential changes in ductility, as shown in Table II. Various combinations of stainless steel and nickel-titanium percentage were also examined for ductility, as shown in Table III. The purpose of this experiment was to identify potential metallic additives that would improve the overall ductility, without introducing variables associated with welding processes, of various alloys of nickel-titanium and stainless steel.

TABLE II

| Sample # | Additive (All baseline compositions 50—50 weight to weight %, Nickel-titanium and Stainless steel) | Ductility Observation |
|---|---|---|
| 18 | Ti - 10% | Extremely brittle |
| 19 | Fe - 10% | 2 hits, moderately brittle |
| 20 | Al - 10% | Extremely brittle |
| 21 | Ti - 20% | Very brittle |
| 22 | Fe - 20% | Very brittle |
| 23 | Al - 20% | Very brittle |
| 24 | Ti - 30% | Very brittle |
| 25 | Fe - 30% | 3 hits to crack |
| 26 | Al - 30% | Very brittle |
| 27 | Fe - 40% | Moderately brittle |
| 28 | Fe - 50% | Moderately brittle |
| 29 | Fe - 50% | 3 hits to break, low ductility, high strength, not brittle |
| 30 | Fe - 50% | 3 hits to break, low ductility, high strength, not brittle |
| 31 | Ti - 40% | Very brittle |
| 32 | Ti - 50% | Slightly less brittle than 40% Ti |
| 33 | Al - 40% | Very brittle |
| 34 | Al - 50% | Very brittle |
| 35 | Ni - 10% | 3 hits, moderately brittle |
| 36 | Ni - 20% | 1 hit, moderately brittle |
| 37 | Ni - 30% | 4 hits to crack in half |
| 38 | Ni - 40% | 5–6 hard hits, no breakage, good ductility |
| 39 | Ni - 50% | Good ductility |
| 44 | Cr - 10% | Brittle |
| 45 | Cr - 20% | Brittle |
| 46 | Cr - 30% | Brittle |
| 47 | Cr - 40% | Brittle |
| 48 | Cr - 50% | Very slightly less brittle than other Cr trials, no ductility |

TABLE III

| | | |
|---|---|---|
| 40 | Stainless steel - 60%<br>Nickel-titanium - 40% | 3 hits to crack into pieces |
| 41 | Stainless steel - 70%<br>Nickel-titanium - 30% | 3 hits to crack into pieces |
| 42 | Stainless steel - 80%<br>Nickel-titanium - 20% | 4–5 hard hits to crack, did not break, good ductility |
| 43 | Stainless steel - 50%<br>Nickel-titanium - 50% | Very brittle |

As seen in Table II, alloys made of equal parts nickel-titanium and stainless steel with significant amounts of added titanium (Samples 21, 24, 31 and 32), added aluminum (Samples 20, 23, 26, 33 and 34), or added chromium (Samples 44 through 48) showed high degrees of brittleness. Alloy made of equal parts nickel-titanium and stainless steel together with added iron showed brittleness at the lower iron range of testing (Samples 19 and 22), which tended to decreased somewhat as the percentage of iron was increased (Samples 27 through 30). Alloys made of equal parts nickel-titanium and stainless steel with added nickel showed an increase in ductility as the amount of added nickel was increased (Samples 35–39). As seen in Table III, control alloys of varying percentages of nickel-titanium and stainless steel with no other additive generally performed poorly, with the partial exception of an 80% stainless steel—20% nickel-titanium composition (Sample 42). In the compositions most closely resembling a direct stainless steel to nickel-titanium weld (Sample 43), the composition fared poorly, again in line with the general observation in the material joining arts that it is extremely difficult to achieve good results welding stainless steel and nickel-titanium. Ti and Fe form the brittle intermetallic compounds TiFe and $TiFe_2$. TiFe has a B2 (CsCl) structure, and $TiFe_2$ has a C14 ($MgZn_2$) structure. Both of these type structures are highly brittle and both can cause "cold-cracking" and failure of the welded article.

In summary, the arc melting composition experiments detailed above indicated that it was promising to attempt to introduce nickel and iron into stainless steel and nickel-titanium welds, and that the addition of such metals as aluminum, chromium, and titanium were highly unlikely to improve weld quality. While additional iron did improve weld quality at relatively high levels, it was not as promising as the addition of nickel, and experimentation was begun to determine a feasible method and procedure for enhancing stainless steel and nickel-titanium welds with added nickel.

In preliminary experimentation, a 0.023" diameter stainless steel wire was lap welded with a pulsed Nd-YAG laser to a 0.019" diameter nickel-titanium wire, after a 0.003" thickness nickel foil insert was placed longitudinally between the wires. The weld showed some improvement over similar lap welds made without added nickel, but the nickel-added welds were still brittle. Microscopic examination showed that it was difficult to achieve proper mixing of the weld metal along the weld line in lap welded wires.

Attention was therefore shifted to a butt welding technique. A 0.023" diameter stainless steel wire was end joined to a 0.019" diameter nickel-titanium wire, placing two strips of 0.003" nickel foil between the ends to be joined. Each piece of nickel foil was 0.020" wide and 0.125" long. Initial welds were made on opposing sides, then the nickel foil was trimmed off and two additional welds were made on opposing sides 90 degrees rotated from the first welds. This produced good strength welds which were able to withstand the stress of having the nickel-titanium wire superelastically bent back on itself. Refinement of the spot welding technique began with a twin weld-lathe setup. Two power turntables were used, with one turntable controller slaved to the other so as to turn in unison together. Under argon shielding, a slow complementary rotation of the turntables allowed the stainless steel and nickel-titanium wires to be turned simultaneously and exposed to a plurality of laser spot welds. In a series of test welds, nickel foil in one or more 0.003" layers with varying rotational speeds and weld patterns produced welds that ranged form poor to excellent. In one particular embodiment, excellent results were obtained using two layers of 0.003" nickel foil; four single laser pulses directed every 90 degrees around the joint at a beam voltage of 225 V and 5 millisecond pulse duration. Experiments were broadened to include 0.004" nickel foil, which appeared to give an excellent quality weld, with subsequent load testing to failure in an approximate range of 84 ksi to 95 ksi.

Analysis indicated that optimal results occur when the relative proportions of nickel, iron, and titanium in the final weld pool are approximately equal, that is, in a weight to weight relationship of approximately 33—33—33%. The technique of the instant invention allows this computation to be effected very efficiently. Knowing the size of the interface of the materials to be joined, the alloy composition of the ferrous metal and titanium or titanium alloy, and the composition of the nickel interlayer, one skilled in the art can calculate the volume of nickel that needs to be melted into the weld pool to achieve optimal proportionality of metals in the final weld pool. Accordingly, it becomes a substantially straightforward calculation to determine the thickness of the nickel that should be placed between the parts to be welded.

Additional refinements in the method of joining titanium, and titanium based alloys, to ferrous metals further improved the process. Analysis of the nickel added welds indicated that while the addition of nickel foil had suppressed the formation of certain brittle intermetallics and had lessened the tendency to "cold cracking" of the joints, the thermal characteristics of nickel-titanium continued to produce some degree of "hot cracking" on the nickel-titanium side of the welds. To avoid fusion line cracking associated with shape memory recovery stresses, the tip of the nickel-titanium wire was annealed using lower power laser pulses. A Unitek YAG laser pulsing at 1 pps for 5 ms at 200V produced a series of overlapping pulses to anneal about one wire diameter back from the tip of the nickel-titanium wire prior to beginning the welding sequence. The one wire diameter of annealed material is approximately equal to the length of the nickel-titanium wire that is later melted in the welding sequence. It was found that extending the annealed section of wire farther than one wire diameter length along the wire of the nickel-titanium did not appear to work as well, as during subsequent bending, the annealed portion of the nickel-titanium outside of the weld area yielded plastically to bending stresses and led to failure, not in the weld area, but in the annealed material adjacent to the weld area. This technique of annealing is not restricted to embodiments welding wire to wire. Annealing may be utilized in any application where it may be deemed desirable to provide stress relieving, that is to say, achieving substantially full recovery of the shape memory strain, of the titanium or titanium alloy prior to welding. Such stress relief may be achieved by annealing, shot peening, or other stress relieving process as would be familiar to one skilled in the art.

To do so, one skilled in the art would select an annealing zone, based on the materials and weld technique planned, designed to encompass the area of the planned weld zone, as well as the areas of heat affected zone near the weld zone. For example, it is widely known in the art that laser welding tends to produce a narrower heat affected zone than do certain other types of fusion welding; therefore laser welding techniques would require a smaller annealed zone than would some other welding techniques.

Figure 2:
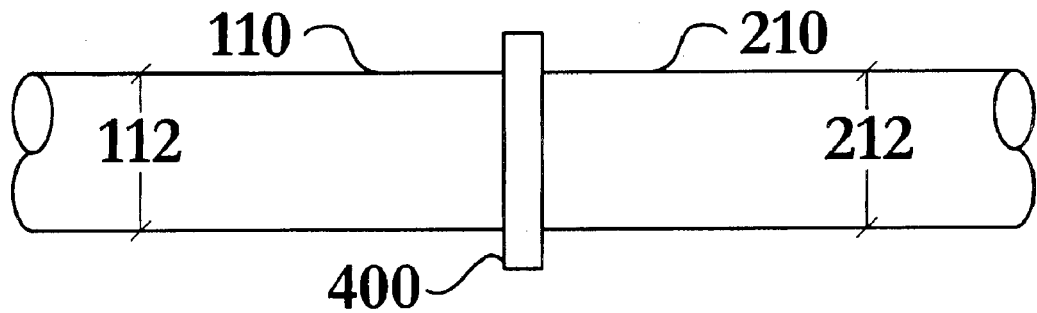
FIG. 2 shows an elevation view of the wires of FIG. 1, wherein the joint is filled with a filler material.
Figure 3:
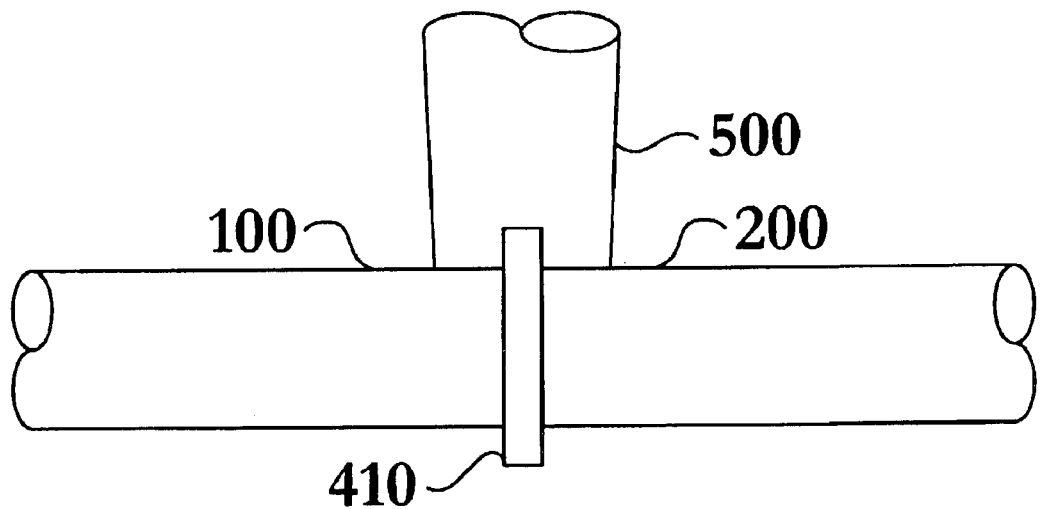
FIG. 3 shows an elevation view of the wires, joint, and filler material of FIG. 2 during the application of a welding means.

With reference generally now to FIGS. 1 through 12, the method comprises a method of welding titanium, or a titanium based alloy, workpiece 100, to a ferrous metal workpiece 200 to produce a strong ductile weld, comprising, in general, the steps, seen in FIGS. 1 through 3, of placing at least one titanium, or a titanium based alloy, workpiece 100, in close proximity to at least one ferrous metal workpiece 200 thereby forming a joint 300. A quantity of a filler material 400 is added substantially at the joint 300. Shielding is provided around the joint, such as by way of example and not limitation, placing the workpieces 100, 200 in a vacuum or flooding the joint 300 with inert gas.

Figure 4:
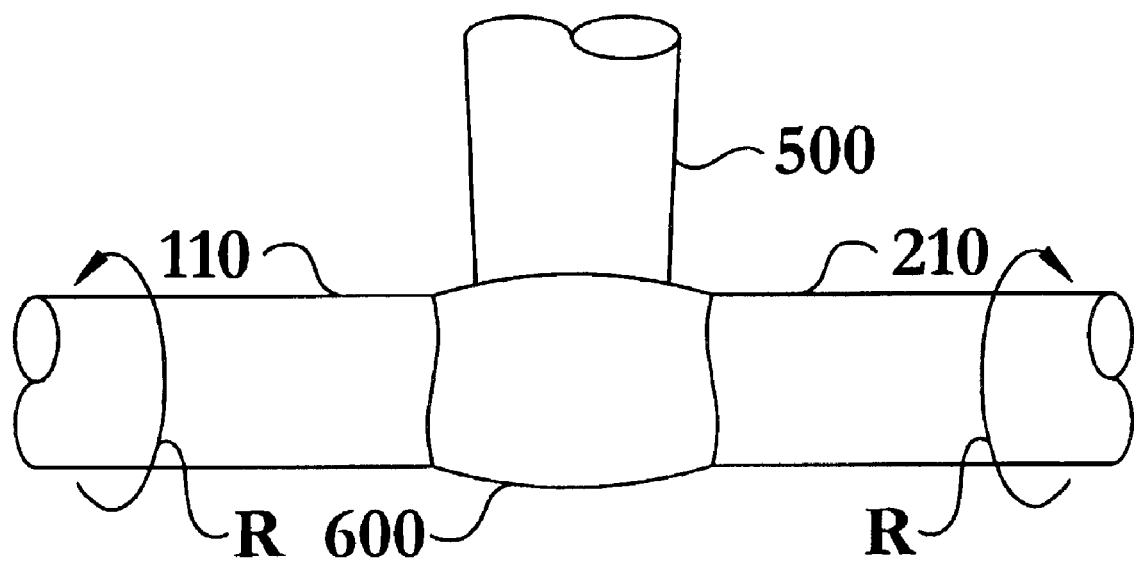
FIG. 4 shows an elevation view of the wires of FIG. 2 during formation of a weld pool.
Figure 8:
FIG. 8 is a light micrograph showing a fusion weld between, on the right, a nickel-titanium wire and, on the left, a ferrous metal (stainless steel) wire, the weld made with no filler material.
Figure 9:
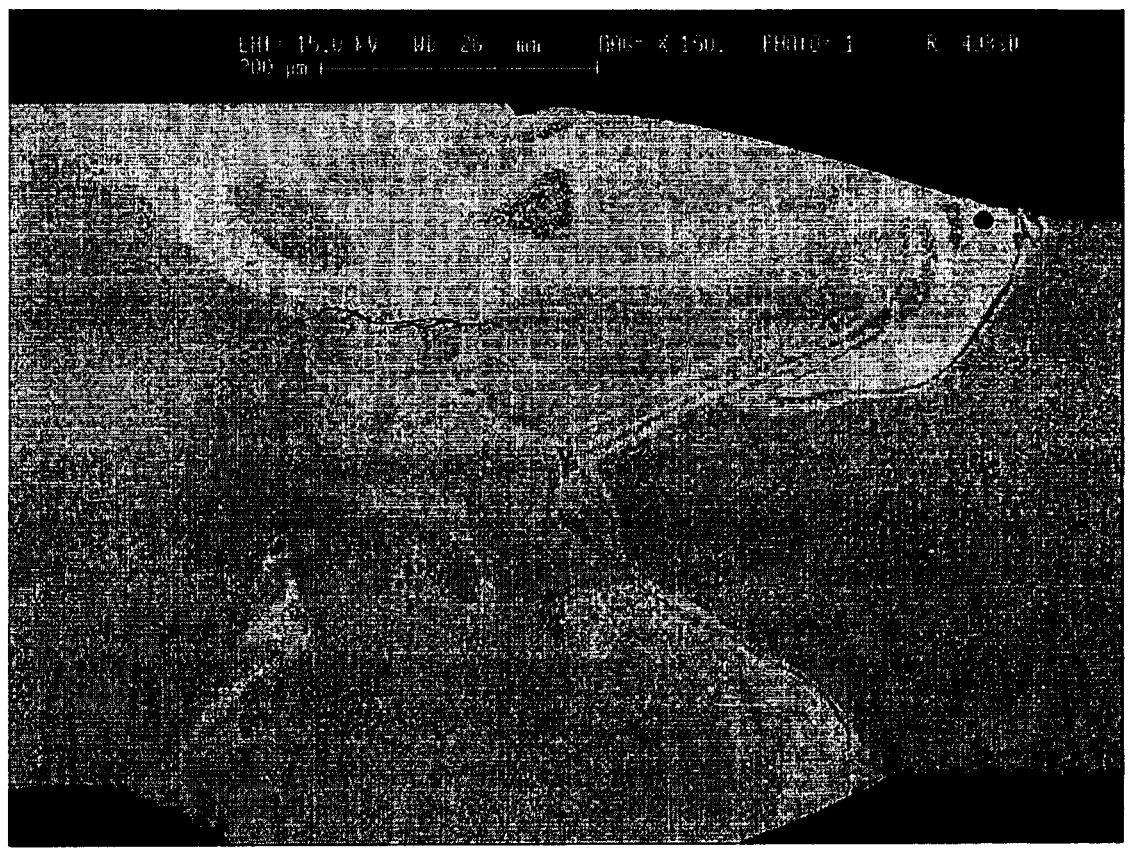
FIG. 9 is a scanning electron micrograph showing a fusion weld between, on the right, a nickel-titanium wire and, on the left, a ferrous metal (stainless steel) wire, the weld made with nickel filler material according to the instant invention.

With reference now to FIG. 4, the joint 300 is then fusion welded, by application of the fusion welding means 500 of any of the numerous processes of fusion welding, including by way of example and not limitation, laser welding. In one embodiment, the fusion welding means 500 producing the weld pool 600 is produced by a beam of a laser, and this laser beam may further be pulsed during the fusion welding. The fusion welding produces a weld pool 600 fully incorporating the filler material 400, as seen in FIGS. 8 and 9, to achieve a predetermined composition of the weld pool.

Numerous refinements and variations of the basic method are possible. For example, the filler material 400 may be any nickel or iron bearing metal or may be substantially pure nickel or may be substantially pure iron. While the method is generally applicable to all titanium, and titanium alloys, and ferrous metal combinations, in one particular embodiment the titanium, or titanium based alloy, workpiece 100 may be nickel-titanium and the ferrous metal workpiece 200 may be stainless steel.

To promote the general quality of the weld, a further step of cleaning the titanium or the titanium based alloy workpiece 100 and the ferrous metal workpiece 200 to substantially remove organic contaminants may be employed.

Further refinement of the technique may, but is not required to, include a step of providing stress relief stress, that is to say, achieving substantially full recovery of the shape memory strain of the titanium, to the titanium, or titanium based alloy, workpiece 100. Such stress relief may be achieved by annealing, shot peening, or other stress relieving process as would be familiar to one skilled in the art.

Figure 5:
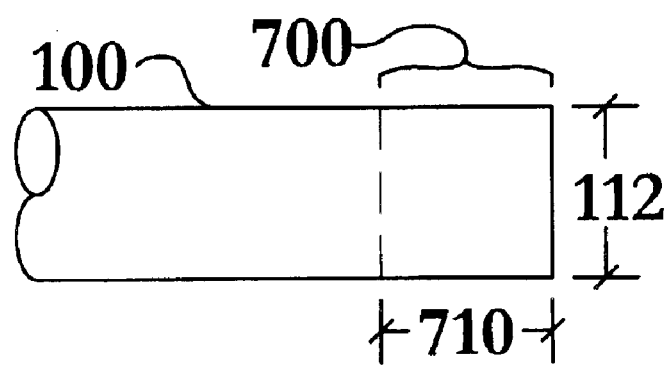
FIG. 5 shows an elevation view of the end of titanium, or titanium based alloy, workpiece showing an area of stress relief.

While the number of material forms amenable to this technique is theoretically not limited, one such combination of workpieces, seen in FIG. 2, may have the titanium, or the titanium based alloy, workpiece 100, as a titanium, or titanium based alloy, wire 110 having a first diameter 112, and having the ferrous metal workpiece 200 as a ferrous metal wire 210 having a second diameter 212. The wires 110, 210 may have substantially the same diameter or significantly different diameters. In those embodiments welding the titanium, or titanium based alloy, wire 110 to the ferrous metal wire 210, and when it is desired to produce stress relief in the titanium, or titanium based alloy, wire 110, such as with laser welding, a preferred embodiment seen in FIG. 5, is to provide stress relief to a predetermined area 700 having a length 710 that is substantially equal to the first diameter 112. In one embodiment, seen in FIG. 4, of wire to wire welding, the titanium, or the titanium based alloy, wire 110 and the ferrous metal wire 210 are simultaneously rotated together in the same direction R during the fusion welding.

Figure 6:
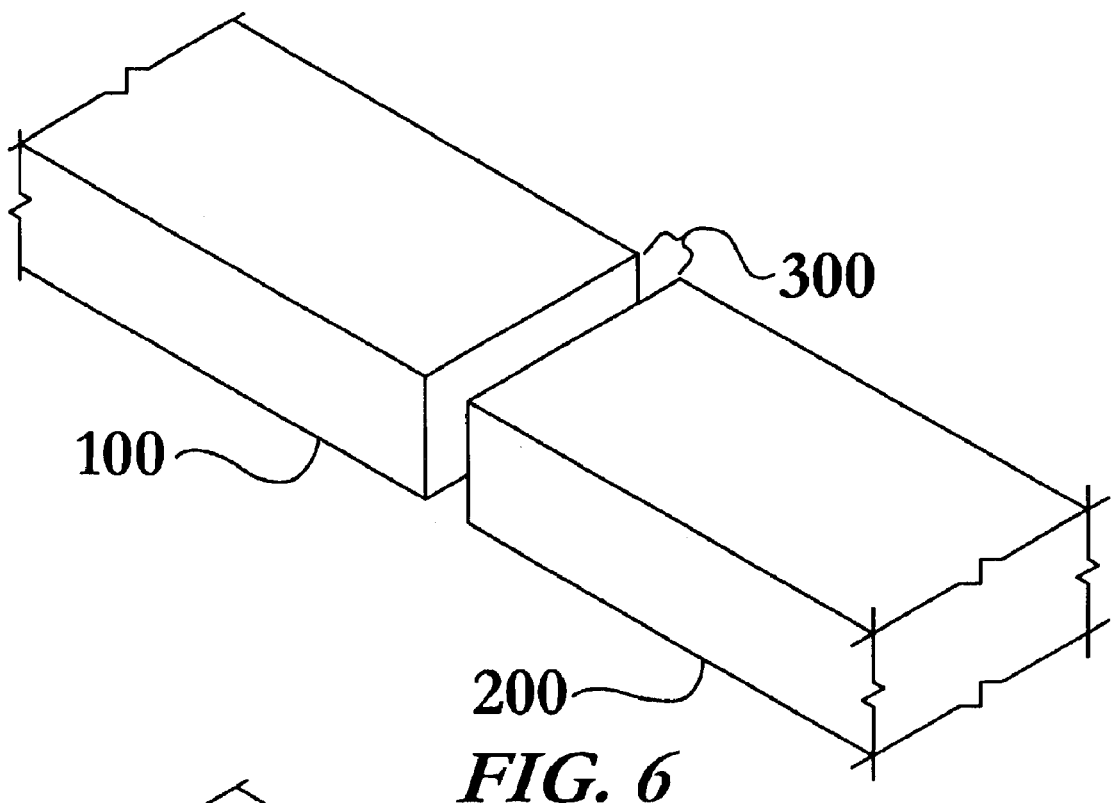
FIG. 6 shows an elevated perspective view of titanium, or titanium based alloy, workpiece and a ferrous metal workpiece in the embodiment of two adjacent bars with a joint between their ends.
Figure 7:
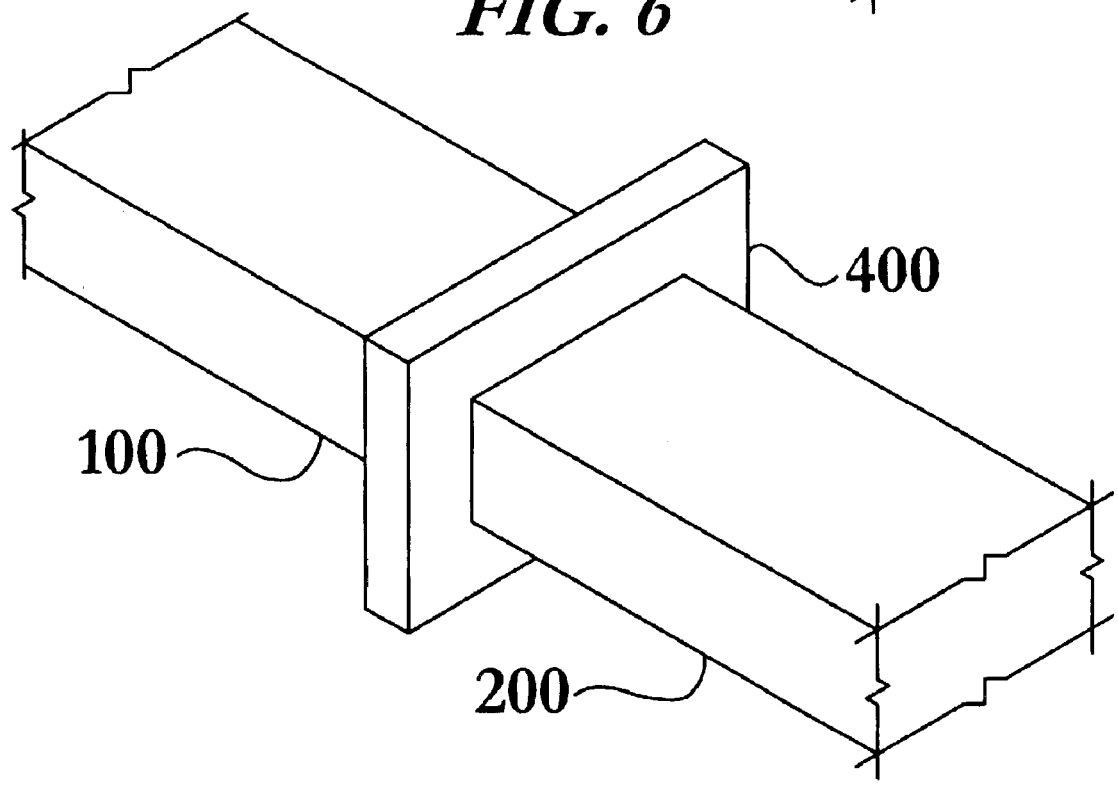
FIG. 7 shows an elevated perspective view of the bars of FIG. 6, wherein the joint is filled with a filler material.

To select one of the many combinations of workpiece materials and filler materials, by way of example and not limitation, the titanium, or the titanium based alloy, wire 110 may be nickel-titanium, the ferrous metal wire 210 may be stainless steel, and the filler material 400 may be substantially pure nickel. In another such combination, the titanium, or the titanium based alloy wire 110 may be nickel-titanium, the ferrous metal wire 210 may be stainless steel, and the filler material 400 may be substantially pure iron. It is to be emphasized that the use of a filler material 400 is not limited to the fusion welding of wire, and the titanium, or titanium alloy, workpiece 100 and the ferrous metal workpiece 200 may be in any form, such as by way of example and not limitation and as illustrated in FIGS. 6 and 7; ribbon, sheet, bar, tubing including microtubing, solid wire, stranded wire, braided wire, sputtering targets, and thin films.

In a preferred embodiment, the predetermined composition of the weld pool 600 is approximately equal parts by weight of nickel-titanium, stainless steel, and nickel. In another embodiment, the predetermined composition of the weld pool 600 is approximately equal parts by weight of nickel-titanium, stainless steel, and iron. Nickel may be supplied to the weld pool in the form of wire, powder, gaskets of predetermined size for use with standard size materials, or in a wide variety of other forms, as would be obvious to one skilled in the art.

The utility of the instant invention is clearly shown in photomicrographs revealing the detailed structure of the welds. FIG. 8 is a light micrograph showing a fusion weld between, on the right, a nickel-titanium wire 110 and, on the left, a ferrous metal (stainless steel) wire 210. Made without filler material, this weld shows extreme cracking at the joint and very poor weld quality.

Figure 10:
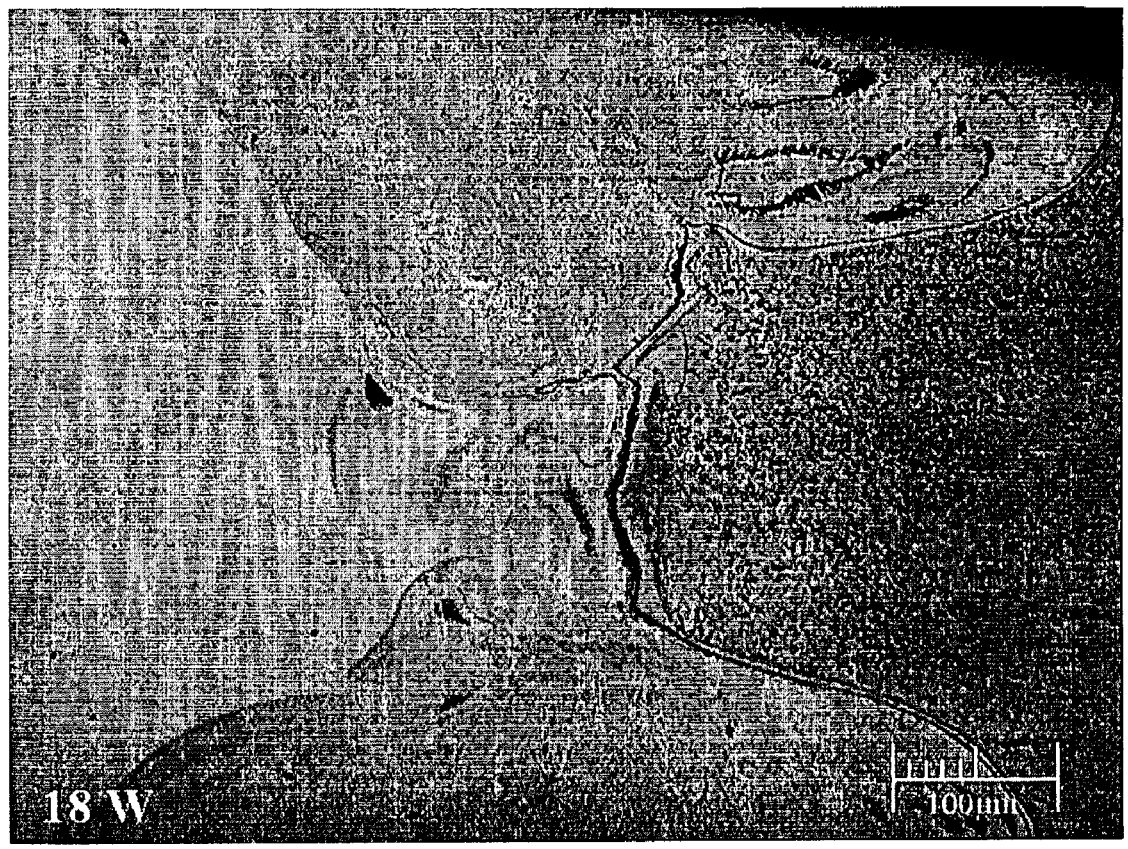
FIG. 10 is an light micrograph showing a fusion weld between, on the right, a nickel-titanium wire and, on the left, a ferrous metal (stainless steel) wire, the weld made with nickel filler material according to the instant invention.
Figure 11:
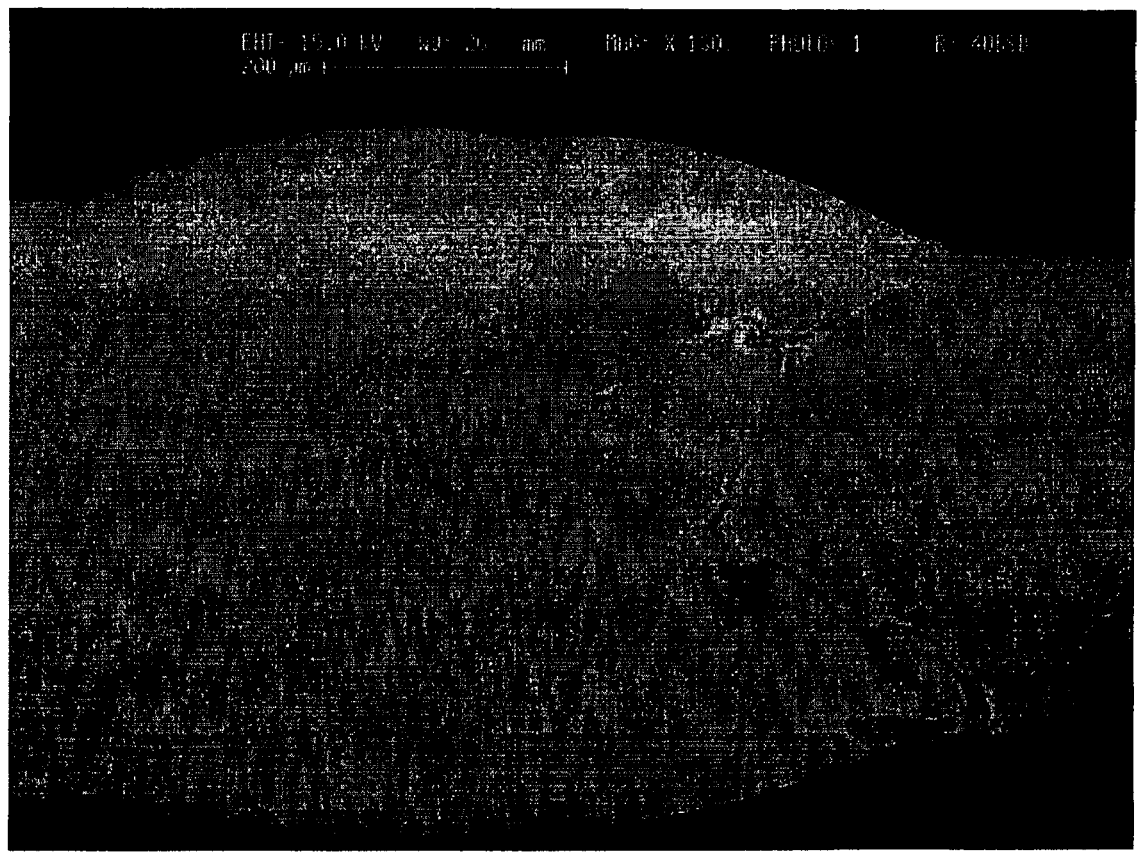
FIG. 11 is a scanning electron micrograph showing a fusion weld between, on the right, a nickel-titanium wire and, on the left, a ferrous metal (stainless steel) wire, the weld made with nickel filler material according to the instant invention.
Figure 12:
FIG. 12 is a light micrograph showing a fusion weld between, on the right, a nickel-titanium wire and, on the left, a ferrous metal (stainless steel) wire, the weld made with nickel filler material according to the instant invention.

FIG. 9 is a scanning electron micrograph showing a fusion weld between, on the right, a nickel-titanium wire 110 and, on the left, a ferrous metal (stainless steel) wire 210, the weld made with nickel filler material, as indicated in the specification and claims of the instant invention, and fabricated with a low heat input laser weld process. The weld shows overall excellent weld quality. FIG. 10 is a light micrograph showing a fusion weld between, on the right, a nickel-titanium wire 110 and, on the left, a ferrous metal (stainless steel) wire 210, the weld made with nickel filler material, as indicated in the specification and claims of the instant invention, and fabricated with a low heat input laser weld process. The weld shows overall excellent weld quality. FIG. 11 is a scanning electron micrograph showing a fusion weld between, on the right, a nickel-titanium wire 110 and, on the left, a ferrous metal (stainless steel) wire 210, the weld made with nickel filler material, as indicated in the specification and claims of the instant invention, and fabricated with a high heat input laser weld process. The weld shows overall excellent weld quality. FIG. 12 is a light micrograph showing a fusion weld between, on the right, a nickel-titanium wire 110 and, on the left, a ferrous metal (stainless steel) wire 210, the weld made with nickel filler material, as indicated in the specification and claims of the instant invention, and fabricated with a high heat input laser weld process. The weld shows overall excellent weld quality.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute, and/or additional or alternative materials, relative arrangement of elements, and dimensional configurations. Accordingly, even though only a few variations of the present invention are described herein, it is to be understood that the practice of such additional modifications and variations and the equivalents thereof, are within the spirit and scope of the invention as defined in the following claims.

The corresponding structures, materials, acts, and equivalents of all means or step plus function elements in the claims below are intended to include any structure, material, or acts for performing the functions in combination with other claimed elements as specifically claimed.

I claim:

1. A method of welding titanium, or a titanium based alloy, to a ferrous metal to produce a strong ductile weld, comprising the steps of:

placing at least one titanium, or a titanium based alloy, workpiece in close proximity to a ferrous metal workpiece thereby forming a joint;

adding a quantity of a filler material substantially at the joint;

providing shielding around the joint; and fusion welding the joint thereby producing a weld pool incorporating a portion of the at least one titanium, or titanium based alloy, workpiece, a portion of the ferrous metal workpiece, and a portion of the filler material to achieve a predetermined composition of the weld pool.

2. The method of claim 1, wherein the filler material contains nickel.

3. The method of claim 1, wherein the filler material contains iron.

4. The method of claim 1, wherein the at least one titanium, or titanium based alloy, workpiece is nickel-titanium and the at least one ferrous metal workpiece is stainless steel.

5. The method of claim 1, further including a step of cleaning the titanium, or the titanium based alloy, workpiece and the ferrous metal workpiece to substantially remove organic contaminants.

6. The method of claim 1, further including a step of providing stress relief to the titanium, or titanium based alloy, workpiece.

7. The method of claim 6, wherein the step of providing stress relief includes an annealing process.

8. The method of claim 6, wherein the step of providing stress relief includes a shot peening process.

9. The method of claim 1, wherein the titanium, or the titanium based alloy workpiece, is a titanium, or titanium based alloy, wire having a first diameter, and the ferrous metal workpiece is a ferrous metal wire having a second diameter.

10. The method of claim 9, wherein the titanium, or the titanium based alloy, wire is nickel-titanium, the ferrous metal wire is stainless steel, and the filler material is substantially pure nickel.

11. The method of claim 9, wherein the titanium, or the titanium based alloy, wire is nickel-titanium, the ferrous metal wire is stainless steel, and the filler material is substantially pure iron.

12. The method of claim 10, wherein the predetermined composition of the weld pool is approximately equal parts by weight of nickel-titanium, stainless steel, and nickel.

13. The method of claim 11, wherein the predetermined composition of the weld pool is approximately equal parts by weight of nickel-titanium, stainless steel, and iron.

14. The method of claim 9, wherein the first diameter and the second diameter are substantially equal.

15. The method of claim 9, further including a step of providing stress relief to the titanium, or titanium based alloy, wire.

16. The method of claim 15, wherein the fusion welding means producing the weld pool is produced by a beam of a laser and the step of providing stress relief is provided to a predetermined area having a length that is substantially equal to the first diameter.

17. The method of claim 15, wherein the step of providing stress relief includes an annealing process.

18. The method of claim 15, wherein the step of providing stress relief includes a shot peening process.

19. The method of claim 9, wherein the fusion welding means producing the weld pool is produced by a beam of a laser.

20. The method of claim 19, wherein the laser beam is pulsed during the fusion welding.

21. The method of claim 9, wherein the titanium, or the titanium based alloy, wire and the ferrous metal wire are simultaneously rotated together in the same direction during the fusion welding.

22. A method of welding titanium, or a titanium based alloy, to a ferrous metal to produce a strong ductile weld, comprising the steps of:

placing at least one nickel-titanium workpiece in close proximity to a stainless steel workpiece thereby forming a joint;

adding a quantity of a filler material substantially at the joint;

providing shielding around the joint; and fusion welding the joint thereby producing a weld pool incorporating the filler material to achieve a predetermined composition of the weld pool.

23. The method of claim 22, wherein the filler material contains nickel.

24. The method of claim 22, wherein the filler material contains iron.

25. The method of claim 22, further including a step of cleaning the nickel-titanium workpiece and the stainless steel workpiece to substantially remove organic contaminants.

26. The method of claim 22, further including a step of providing stress relief to the nickel-titanium workpiece.

27. The method of claim 26, wherein the step of providing stress relief includes an annealing process.

28. The method of claim 26, wherein the step of providing stress relief includes a shot peening process.

29. The method of claim 22, wherein the nickel-titanium workpiece is a nickel-titanium wire having a first diameter and the stainless steel workpiece is a stainless steel wire having a second diameter.

30. The method of claim 29, wherein the filler material contains nickel.

31. The method of claim 29, wherein the filler material contains iron.

32. The method of claim 30, wherein the predetermined composition of the weld pool is approximately equal parts by weight of nickel-titanium, stainless steel, and nickel.

33. The method of claim 31, wherein the predetermined composition of the weld pool is approximately equal parts by weight of nickel-titanium, stainless steel, and iron.

34. The method of claim 29, wherein the first diameter and the second diameter are substantially equal.

35. The method of claim 29, further including a step of providing stress relief to the nickel-titanium wire.

36. The method of claim 35, wherein the fusion welding means producing the weld pool is produced by a beam of a laser and the step of providing stress relief is provided to a predetermined area having a length that is substantially equal to the first diameter.

37. The method of claim 35, wherein the step of providing stress relief includes an annealing process.

38. The method of claim 35, wherein the step of providing stress relief includes a shot peening process.

39. The method of claim 29, wherein the fusion welding means producing the weld pool is produced by a beam of a laser.

40. The method of claim 39, wherein the laser beam is pulsed during the fusion welding.

41. The method of claim 29, wherein the nickel-titanium wire and the stainless steel wire are simultaneously rotated together in the same direction during the fusion welding.

42. A method of welding titanium, or a titanium based alloy, to a ferrous metal to produce a strong ductile weld, comprising the steps of:

providing a nickel-titanium workpiece formed as a nickel-titanium wire having a first diameter and a stainless steel workpiece formed as a stainless steel wire having a second diameter;

providing stress relief by annealing the nickel-titanium wire in a predetermined area having a length that is substantially equal to the first diameter;

cleaning the nickel-titanium wire and the stainless steel wire to substantially remove organic contaminants;

placing the nickel-titanium wire in close proximity to the stainless steel wire thereby forming a joint;

adding a quantity of a nickel substantially at the joint;

providing shielding around the joint;

simultaneously rotating the nickel-titanium wire and the stainless steel wire together in the same direction; and pulsed laser fusion welding the joint thereby producing a weld pool wherein the predetermined composition of the weld pool is approximately equal parts by weight of nickel-titanium, stainless steel, and nickel.

* * * * *